Dec. 9, 1969 W. F. WOLFNER 3,482,839

MAGNETIC TAPE DECK WITH CARTRIDGE-HOLDING SLIDE TO ACCOMMODATE DIFFERENT SIZE CARTRIDGES

Filed July 1, 1966 7 Sheets-Sheet 1

INVENTOR.
WILLIAM F. WOLFNER
BY
Teroole, Jochums & Hamley
ATTORNEYS

Dec. 9, 1969 W. F. WOLFNER 3,482,839

MAGNETIC TAPE DECK WITH CARTRIDGE-HOLDING SLIDE TO ACCOMMODATE DIFFERENT SIZE CARTRIDGES

Filed July 1, 1966 7 Sheets-Sheet 2

INVENTOR.
WILLIAM F. WOLFNER

BY [signature]

ATTORNEYS

Dec. 9, 1969 W. F. WOLFNER 3,482,839

MAGNETIC TAPE DECK WITH CARTRIDGE-HOLDING SLIDE TO ACCOMMODATE DIFFERENT SIZE CARTRIDGES

Filed July 1, 1966

7 Sheets-Sheet 3

INVENTOR.
WILLIAM F. WOLFNER

BY Trask, Jenkins & Hanley

ATTORNEYS

INVENTOR.
WILLIAM F. WOLFNER
BY
Toulmin, Julius & Hanley
ATTORNEYS

INVENTOR.
WILLIAM F. WOLFNER
BY
Teasby, Jenkins & Healey
ATTORNEYS

INVENTOR.
WILLIAM F. WOLFNER
BY
Trask, Jenkins & Hanley
ATTORNEYS

INVENTOR.
WILLIAM F. WOLFNER
BY
Trask, Jenkins & Hanley
ATTORNEYS

United States Patent Office 3,482,839 Patented Dec. 9, 1969

3,482,839 MAGNETIC TAPE DECK WITH CARTRIDGE-HOLDING SLIDE TO ACCOMMODATE DIFFERENT SIZE CARTRIDGES

William F. Wolfner, Columbus, Ind., assignor to Arvin Industries, Inc., Columbus, Ind., a corporation of Indiana Filed July 1, 1966, Ser. No. 562,340
Int. Cl. G11b *5/78*
U.S. Cl. 274—4 24 Claims

ABSTRACT OF THE DISCLOSURE

A magnetic tape deck has a cartridge-carrying slide which accommodates different sizes and types of cartridges. The slide functions in cooperation with a sensing device on the deck to determine the driving requirements of the cartridge, and the deck additionally features an indexing mechanism for shifting the head.

This invention relates to a magnetic tape deck and more particularly to an apparatus for playing cartridges of endless coils of magnetic tape.

Magnetic tape recordings are commonly available in cartridges with the recorded signals disposed in vertically spaced tracks along the tape. The tape in such cartridges is in the form of an endless coil, and to play the tape it is necessary merely to drive the tape in the cartridge over a transducer head. The basic problems involved in playing such tape cartridges are that said cartridges require different yptes of tape driving mechanisms, the cartridges are available in different sizes, and the tapes have different numbers of signal tracks on them which are disposed in different vertical orientations.

It is therefore the object of the instant invention to provide an apparatus which will drive and play endless coils of magnetic tape, which will automatically play and drive such tapes housed in different size cartridges, which will automatically drive and play such tapes housed in cartridges having different tape drive requirements, and which will release such cartridges after the tapes therein have been played. It is a further object of the invention to provide an apparatus which will automatically play and drive such tapes in which the signal tracks are disposed in different orientations on the tapes, and which can automatically switch from one signal track to another.

In accordance with one form of the invention for playing magnetic tapes having pluralities of tracks thereon and carried in cartridges having different tape driving requirements and different sizes, there is provided a platform having a cartridge-carrying slide mounted thereon. A link assembly is mounted on said platform for releasably holding different size cartridges on the slide. The slide is movable on the platform between a retracted position in which the cartridge and the tape carried therein are disposed in spaced relation to a driving capstan and a transducer head and a plurality of operative positions for the different size cartridges in which said tape is disposed against said capstan and head. Conveniently, said head may be connected to any conventional type of sound reproducing equipment for reproducing in audible form the signal taken from the tracks on the tape by the head. Said link assembly and platform are provided with a series of stops cooperatively engageable with a stop lever carried on the slide for releasably locking the slide in its various operative positions.

One type of commercially available tape cartridge requires a pinch roller to be inserted into the cartridge for holding the tape against a driving capstan, while another type has its own pinch roller built into the cartridge. In order to drive the tape in the former, a pinch roller is mounted on the slide and is biased upwardly toward an operative position for holding a tape in driving relation with the capstan. Said roller is mounted on an axle having an arm thereon engageable with a stop on the platform for retaining the pinch roller in a lowered retracted position when the slide is in its retracted position. A sensing roller is mounted on the slide and is engageable with the cartridge mounted thereon. Said sensing roller is connected to a pair of levers, operative when the sensing roller senses a cratridge not requiring the use of the slide pinch roller, which are movable into a position to prevent said pinch roller from being moved upwardly into an operative position when the slide is moved into one of its operative positions. Said sensing roller causes said pair of levers to move into a position to permit the pinch roller to move upwardly into its operative position when said sensing roller senses a cartridge which requires use of the slide pinch roller to drive its tape.

The transducer head is mounted on an arm having a downwardly projecting cam follower engageable with a rotatable stepping cam having a plurality of cam faces thereon whereby stepwise rotation of said cam will cause the head to move into selective engagement with the several signal tracks on the tape. Rotation of said cam is effected by a pair of cranks eccentrically mounted on a driven gear selectively movable into engagement with a driver gear to cause said cranks to engage said cam for rotating it in a stepwise sequence for stepping the head from one track to another on the tape. Conveniently, said driven gear is operatively connected to a solenoid actuatable for causing said driven gear to move into driving engagement with said driver gear to thus effect the indexing movements of the head with respect to the tape. The solenoid is actuated by a switch closable by lever means on the slide engageable with the stops on the platform for thus causing the head to index upon a slight inward movement of the slide after it is releasably locked in one of its operative positions. Said solenoid is also actuated to cause the head to index from one track to another by a sensor mounted on the slide and engageable with signal spots commonly provided on the tapes at the ends of the recorded tracks thereon.

Those cartridges not having their own pinch rollers normally employ tapes having four tracks, while those cartridges which have their own pinch rollers normally employ eight tracks. Therefore, it is desirable to cause the stepping cam to move either one or two steps during its rotation, the one step rotation being effected by one of the pair of cranks on the driven gear and the two step rotation being effected by the other of said pair of cranks. When the slide pinch roller is not employed, and thus a one step rotation of the cam is required, said other crank is retained out of engagement of the cam upon rotation of the driven gear by a pitman movable by a pair of levers operatively interconnected to the lever closing the switch for the solenoid. The tapes in the cartridges which do not require use of the slide pinch roller employ eight tracks, and thus their upper tracks are spaced closer to the upper edges of the tapes than the upper tracks on the tapes in the cartridges which require the use of the slide pinch roller. To this end, the stepping cam is mounted on a rotatable elevating cam connected to the pitman for moving the two step crank out of engagement with the stepping cam. Thus, movement of the pitman to disengage the two step crank rotates the elevating cam to move the stepping cam and transducer head with respect to the tape for orienting said head with respect to the uppermost track on the tape in the cartridge employed. The stop lever on the slide engageable with the stops on the platform for releasably locking the slide in its operative positions is movable upon rotation of the stepping cam through a predetermined arc to disengage from said stops and permit the slide to move to its retracted position for thus releasing the cartridge.

Conveniently, switch means are provided for automatically controlling the audio reproduction apparatus connected to the transducer head in response to movement of said slide between its retracted and operative positions.

Other objects and features of the invention will become apparent from the more detailed description which follows and from the accompanying drawings, in which.

Figures 8, 9, 10, 11:
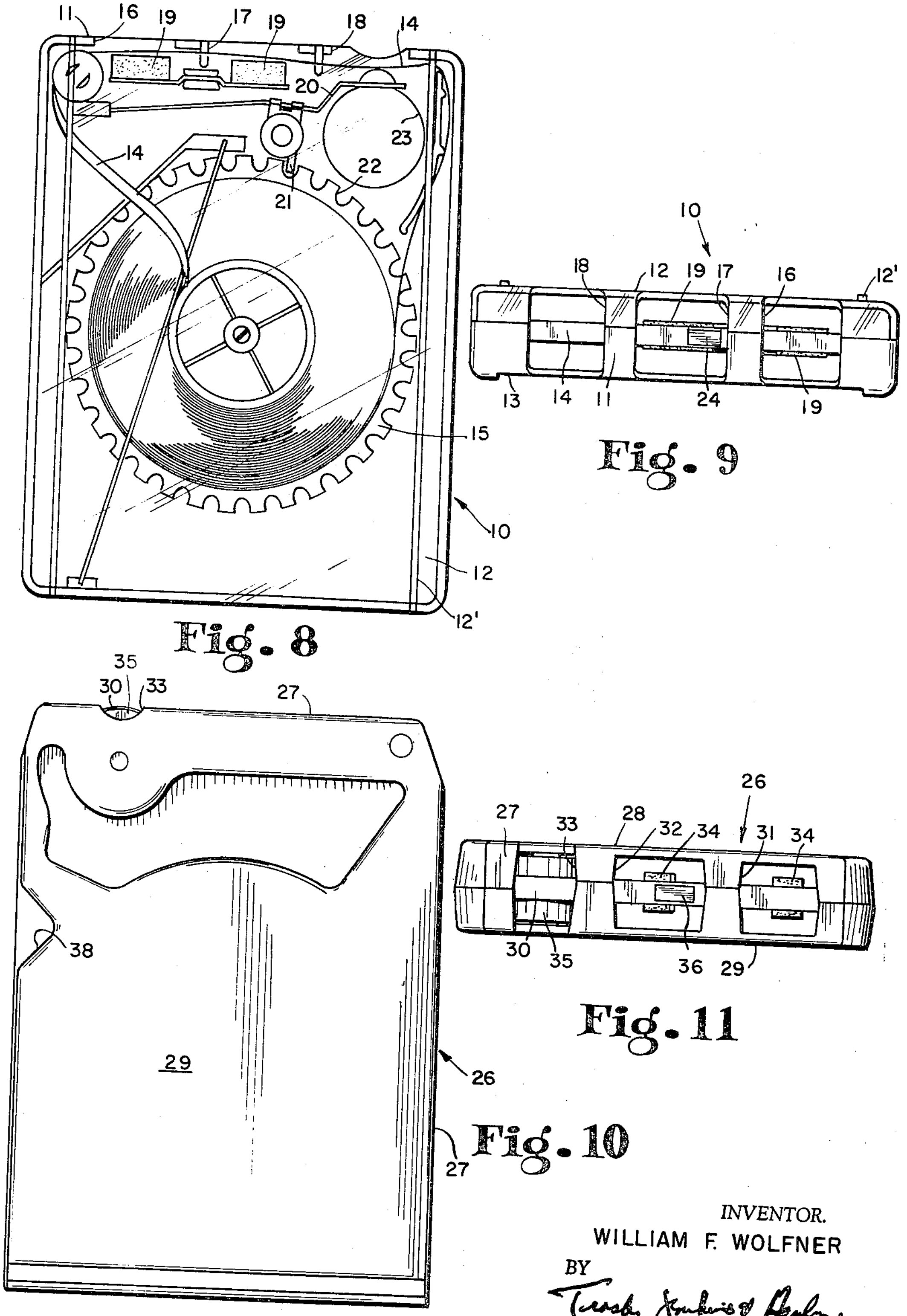
FIG. 8 is a plan view of one type of tape cartridge adapted to be employed with the invention.
FIG. 9 is an end elevation of the cartridge shown in FIG. 8.
FIG. 10 is a bottom plan view of another type of cartridge adapted to be employed with the invention.
FIG. 11 is an end view of the cartridge shown in FIG. 10.

My apparatus is adapted to automatically play endless coils of magnetic tape carried in protective cartridges. One type of cartridge that is commercially available is illustrated in FIGS. 8 and 9. As shown, cartridge 10 has a rectangular shape and comprises planar side walls 11 interconnecting top and bottom walls 12 and 13, said top wall having a longitudinally extending rib 12' adjacent its right margin. The coil of magnetic tape 14 is carried on a reel 15 mounted within the cartridge and is fed to and from said reel past a plurality of windows 16, 17, and 18 formed in one of the cartridge side walls. A pair of outwardly biased pressure pads 19 are mounted in the cartridge to hold the tape adjacent the windows 16 and 17. A lock spring 20 is also mounted in the cartridge and is connected to a finger 21 receivable in a plurality of notches 22 in the circumference of reel 15. Spring 19 extends over an opening 23 in the cartridge bottom wall 13 and is adapted to swing the finger 21 out of locking engagement with the reel notches 22 when a pinch roller enters opening 23 to dispose the tape between said pinch roller and a driving capstan at window 18. As shown in FIG. 9, an electrically conducting sensing spot 24 is normally provided on the tape 14 to provide a means for automatically indexing a transducer head from one tape track to another. Cartridges of this design are the subject matter of and are described in Eash U.S. Patent Nos. 2,778,880 and 2,876,005.

Another type of cartridge 26 that is commercially available is shown in FIGS. 10 and 11. As shown, said cartridge, which also has a rectangular shape, comprises a plurality of side walls 27 interconnecting top and bottom walls 28 and 29. An endless coil of magnetic tape 30 is housed in said cartridge and is movable past a series of windows 31, 32, and 33 formed in one of the side walls 27. A pair of outwardly biased pressure pads 34 are mounted in the cartridge to hold the tape adjacent the windows 31 and 32. A pinch roller 35 is also mounted in the cartridge to dispose tape 30 at window 33 in a position such that it will be interposed between a driving capstan and said roller. Like tape 14, tape 30 also has an electrically conducting sensing spot 36 to permit a transducer head to be automatically indexed from one track to another on said tape. As shown in FIG. 10, a notch 38 is formed in the bottom wall 29 and one of the side walls 27 of the cartridge. This is contrasted to the planar side walls 11 in cartridge 10. Thus, cartridge 26 primarily differs from cartridge 10 in the provision of the notch 38 and in the provision of its own pinch roller 35.

The tapes normally employed with cartridges 26 are provided with eight tracks of recorded signals, while the tapes normally employed with the cartridges 10 are provided with two or four tracks of recorded signals. Further, cartridges 10 are commercially available in three different sizes, the sizes of said cartridges 10 being dependent upon differences only in their lengths and widths and the positioning of their ribs 12' from the right margin. The depth of the three sizes of cartridges 10 being constant and the same as the depth of cartridges 26. My apparatus is adapted to automatically play the tapes in all three sizes of the cartridges 10 and cartridges 26 and any of the various track and recorded signal combinations thereon.

Figure 1:
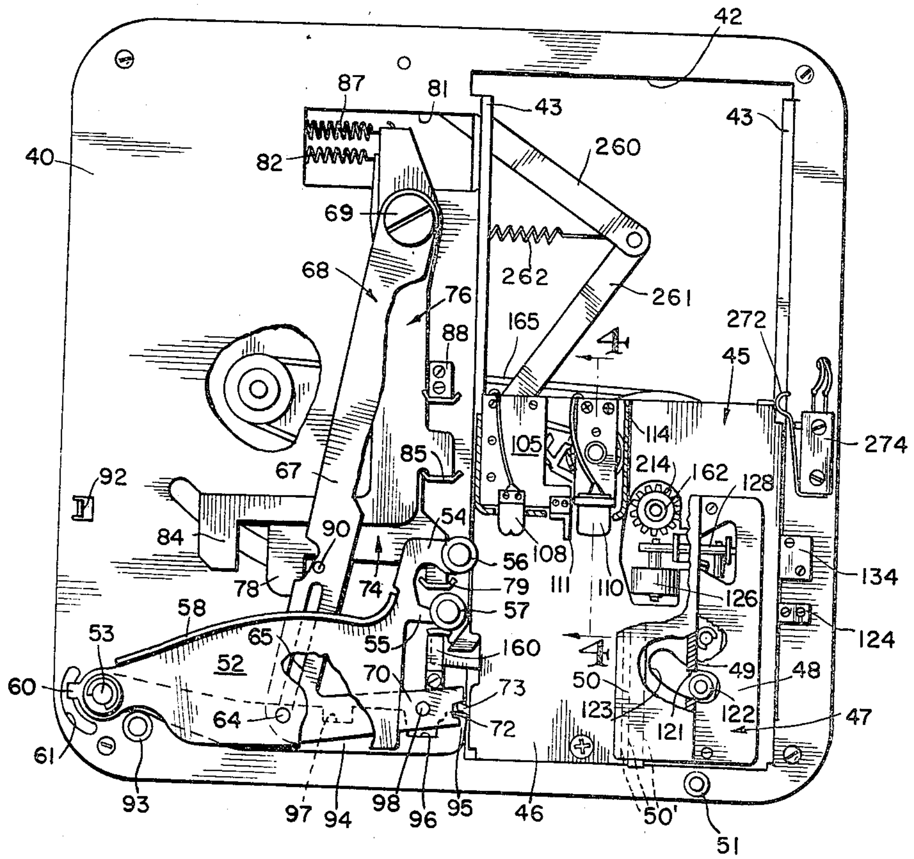
FIG. 1 is a plan view of a tape deck embodying the invention.

As shown in FIG. 1, my apparatus comprises a supporting platform 40 having a rectangular opening 42 formed therein. A pair of tracks 43 extend along the longitudinal edges of the opening 42 and support a movable slide 45 provided with a cover plate 46 adapted to support the cartridges 10 and 26. In order to locate the cartridges 10 and 26 in an operative position on the slide, said slide is provided with a generally Z-shaped bracket 47 having a flange 48 mounted on the plate 46 and interconnected by a vertical web 49 to an upper inwardly extending flange 50 adapted to overlie the cartridge top wall. A plurality of laterally spaced grooves 50' are formed in the underside of flange 50 for the reception of the cartridge ribs 12' to facilitate alignment of said cartridges on the slide. A guide roller 51 is mounted on the forward edge of the platform in alignment with the web 49 for thus guiding one side wall of the cartridge into abutting engagement with the web 49.

Figure 2:
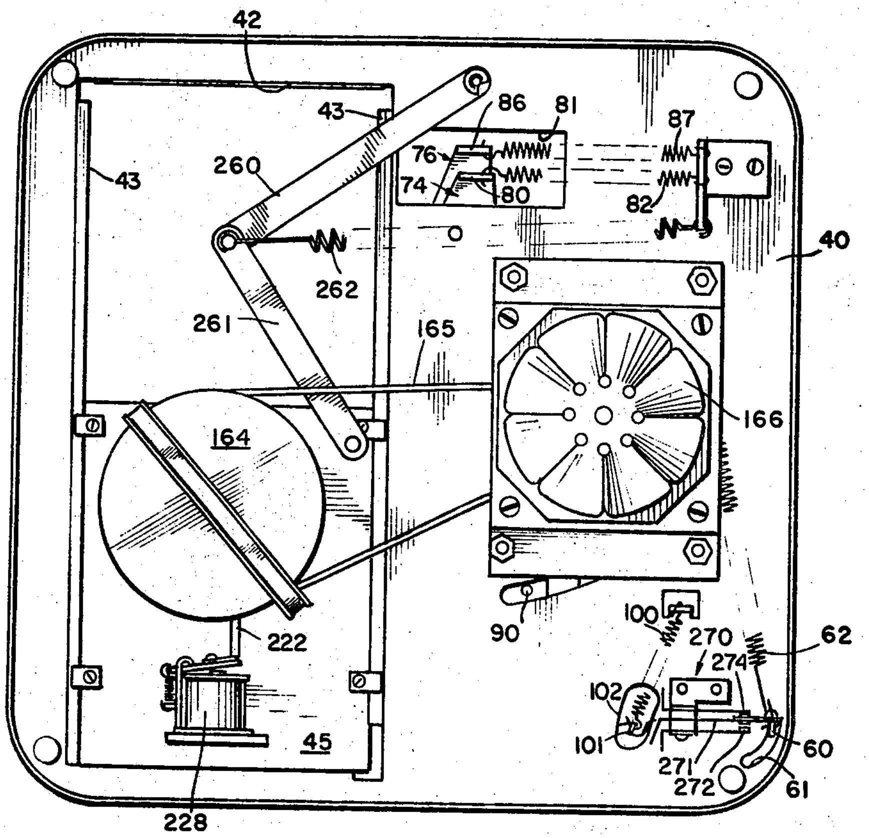
FIG. 2 is a bottom plan view of the deck shown in FIG. 1.

The cartridges are releasably retained in abutting engagement with bracket web 49, irrespective of the size of the cartridge employed, by a linkage assembly shown in FIG. 1. Said assembly comprises a guide arm 52 horizontally swingable about a post 53 mounted on platform 40. Adjacent its end remote from post 51, said arm is provided with a pair of outwardly projecting fingers 54 and 55 upon which guide rollers 56 and 57 are mounted. An upwardly projecting arcuate flange 58 is formed along the rear edge of arm 52 so that the larger cartridges will swing the arm outwardly for insertion of said larger cartridges into the apparatus. In order to releasably retain the guide arm in its retracted position shown in FIG. 1, said arm is provided at its end remote from the rollers 56 and 57 with a downwardly projecting lug 60 movable in an arcuate slot 61 in the platform and connected to a spring 62 mounted on the underside of said platform as shown in FIG. 2.

A pin 64 projects downwardly from arm 52 and is slidably received in an elongated slot 65 formed in arm 67 of a L-shaped link 68. One end of the arm 67 is swingably connected to a post 69 mounted on platform 40 and the opposite end of said arm is continuous with a second arm 70 having a locking notch 72 in its outer end receivable around a stop 73 projecting outwardly from the slide 45 adjacent its forward edge.

A pair of stop links 74 and 76 are also swingably mounted on the post 69 and underlie lever 68, link 76 being interposed between link 74 and lever 68. As is best shown in FIG. 1, stop link 74 is provided at one of its ends with a laterally spaced hook 78 and an upwardly projecting stop 79. The opposite end of said link is provided with a lug 80 projecting downwardly through an opening 81 in platform 40 and connected to a spring 82 mounted on the underside of said platform. In a similar manner, stop link 76 is provided at one of its ends with a hook 84 and an upwardly projecting stop 85, hook 84 being disposed laterally outwardly from hook 78 on link 74 and stop 85 being disposed rearwardly of stop 79. The end of link 76 opposite its hook 84 and stop 85 terminates in a lug 86 projecting through the platform opening 81 and connected by a spring 87 to the underside of platform 40. A third upwardly projecting stop 88 is also mounted on the upper face of the platform 40 rearwardly of stop 85. The springs 82 and 87 urge the stop links 74 and 76 to swing in a counterclockwise direction as viewed in FIG. 1 toward a retracted position in which they bear against stop 88. In such retracted position link stops 79 and 85 are in alignment with stop 88 and in longitudinally spaced relation to stop 88 and to each other. Links 74 and 76 are swung in a clockwise direction to accommodate the cartridges having larger cross-sectional extents by a downwardly projecting pin 90 mounted on lever arm 67 and adapted to engage the hooks 78 and 84 on said links.

Figure 13:
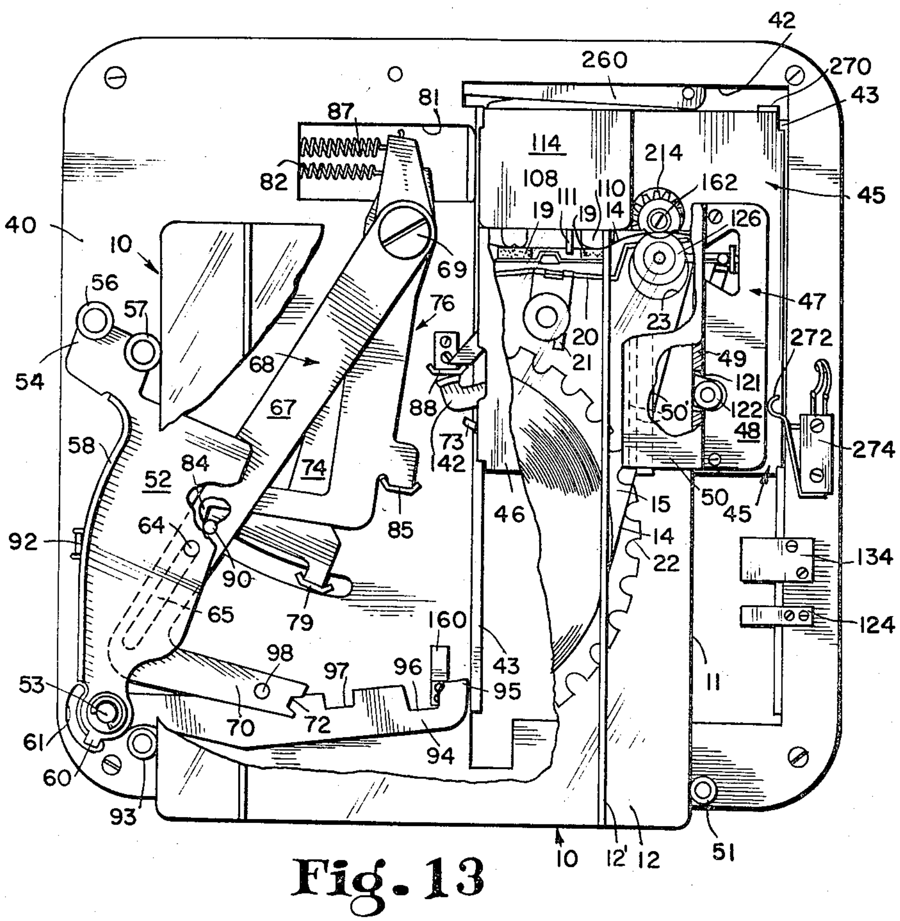
FIG. 13 is a plan view similar to FIG. 12 but showing in an operative position the largest size cartridge of the type shown in FIG. 8.

Thus, if a small cartridge is inserted into the apparatus, its side walls bear against bracket web 49 and roller 56 to swing the guide arm 52 outwardly whereupon pin 64 riding in slot 65 swings lever 68 clockwise as viewed in FIG. 1 to release the lever locking notch 72 from the slide stop 73. If an intermediate size cartridge is inserted into the apparatus, said cartridge will engage first flange 58 and then roller 57 to swing guide arm 52 outwardly causing the lever 68 to swing outwardly with its pin 90 bearing against hook 78 on link 74 to swing said link in a clockwise direction for disposing its stop 79 out of alignment with stops 85 and 88. If the largest size cartridge is inserted into the apparatus, the swinging movements of guide arm 52, lever 68, and link 74 just described will be increased to the point where the lever pin 90 hits hook 84 on link 76 to swing said link in a clockwise direction out of alignment with stop 88 as shown in FIG. 13. In this extreme position, the swinging movements of linkage assembly are limited by flange 58 on arm 52 abutting a stop 92 mounted along the edge of platform 40. Thus, one side of the cartridges is disposed against the slide bracket 48 and guide roller 51, with the opposite side of the smallest cartridge disposed against roller 56, the opposite side of the intermediate size cartridge disposed against roller 57, and the opposite side of the largest cartridge disposed against roller 57 and a guide roller 93 mounted on the front edge of the platform. The rib 12' on each of said cartridges is retained in one of the bracket grooves 50' to prevent the cartridge cocking under the action of the spring pressure on guide arm 52.

The linkage assembly is releasably retained in its different positions of adjustment for the smallest and intermediate sized cartridges by a link 94 swingably mounted on post 53 below the plane of lever 68. Notches 96 and 97 are provided along one edge of link 94 for the reception of a downwardly projecting pin 98 mounted on arm 70 of lever 68. Said link is biased rearwardly to cause pin 98 to be received in notches 96 and 97 by a spring 100 mounted on the underside of the platform and connected to a lug 101 on said link projecting downwardly through an opening 102 in said platform. An abutment 95 on the inner end of said link engages slide stop 73 when said slide is in its retracted position.

Figures 3, 4, 5:
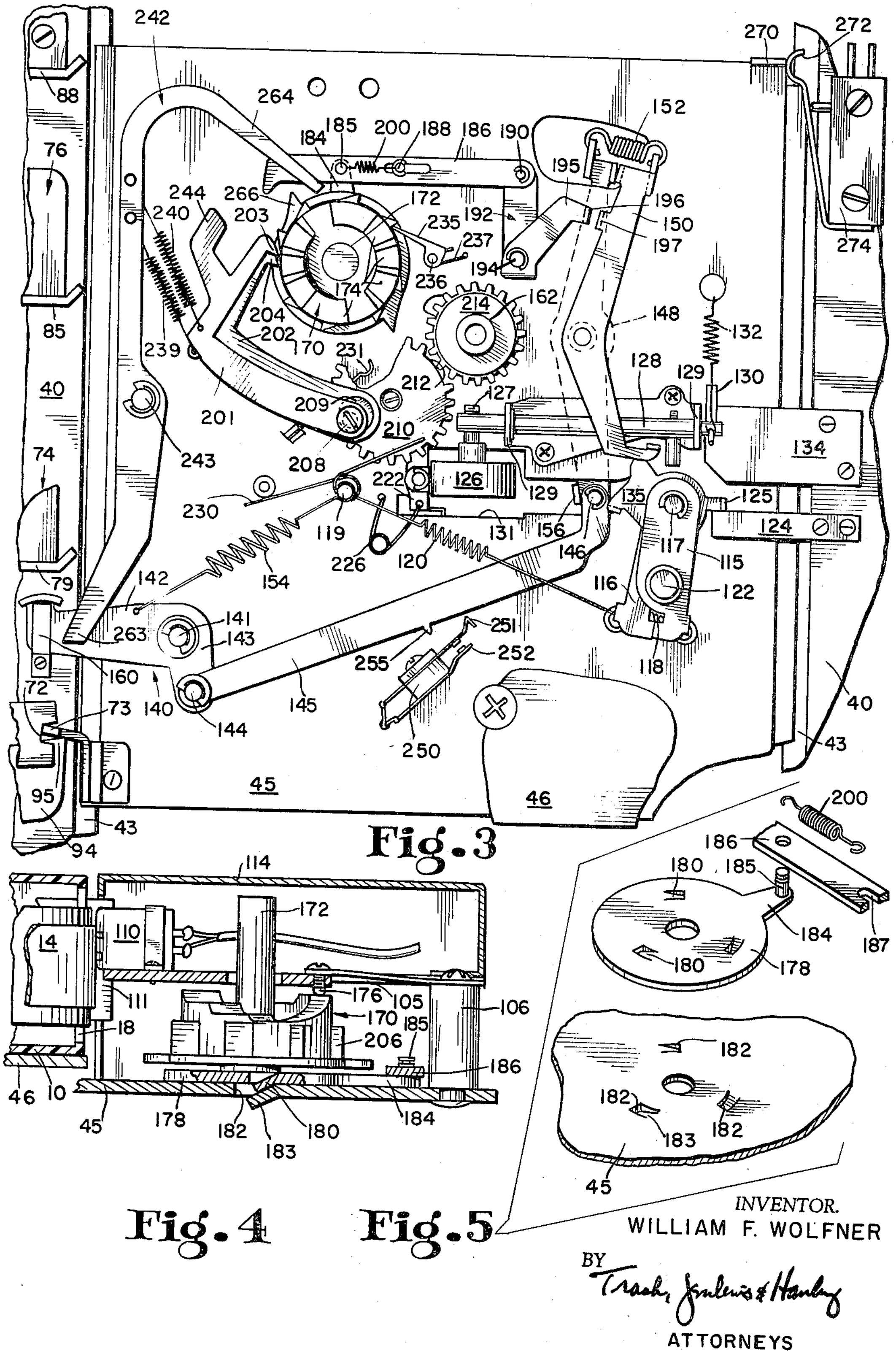
FIG. 3 is an enlarged plan view of the tape cartridge slide assembly but with portions thereof being broken away.
FIG. 4 is an enlarged vertical section taken on the line 4—4 of FIG. 1 and showing a tape cartridge of the type shown in FIG. 8 in operative position.
FIG. 5 is an exploded perspective view of the elevating cam shown in FIG. 4.

As shown in FIGS. 1 and 4, a floor 105 is mounted in an elevated position above the slide plate 46 on a plurality of posts 106. An electrical sensing element 108 is mounted on the floor 105 to project through cartridge windows 17 and 32 and engage the conductive spots 24 and 36 on the tapes for indexing a transducer head 110 with respect to the tape tracks as will be more fully described hereinafter. A generally U-shaped track guide 111 also projects forwardly from floor 105 for reception in the cartridge windows 17 and 32 for guiding movements of the tapes as they move over head 110 and sensor 108. As best shown in FIG. 4, the head 110, which is adapted to project through windows 17 and 32 to engage the tape tracks, is mounted on a downwardly biased spring arm 112 connected to one of the posts 106, said spring arm permitting vertical indexing movements of the head with respect to the tapes 14 and 30 when they are in their operative positions in engagement with said head for thus disposing said head against the desired track or tracks on the tapes. Desirably, a cover plate 114 is mounted on the posts 106 and extends over the sensor 108, guide 111, and head 110, with said elements projecting forwardly therefrom.

In order to determine the tape driving requirements of the cartridge inserted into the apparatus, I provide a sensing assembly interposed between the slide 45 and its cover plate 46. As shown in FIG. 3, the sensing assembly comprises a pair of levers 115 and 116 swingably mounted on post 117. Said levers are interconnected by a spring 118, and lever 116 is biased to the left as viewed in FIG. 3 by a spring 120 of lesser strength than spring 118 and connected to post 119. A sensing roller 122 is mounted on lever 115 and projects upwardly therefrom through an arcuate opening 123 in cover plate 46 and an opening 121 in the bracket web 49 to engage the adjacent side wall of cartridges 10 and 26. Should cartridge 26 be inserted into the apparatus, spring 120 urges roller 122 into the cartridge recess 38 in the manner illustrated in FIG. 15, but should cartridge 10 be inserted into the apparatus, roller 122 will merely engage the adjacent side wall 11 of said cartridge in the manner shown in FIGS. 12 and 14. A stop 124 on platform 40 projects inwardly between slide 45 and its cover plate 46 for engagement with an upwardly projecting finger 125 on lever 116 for thus restraining the inward swinging movement of levers 115 and 116 under the action of spring 120 when the slide is in its retracted position shown in FIG. 3.

Figures 12, 14:
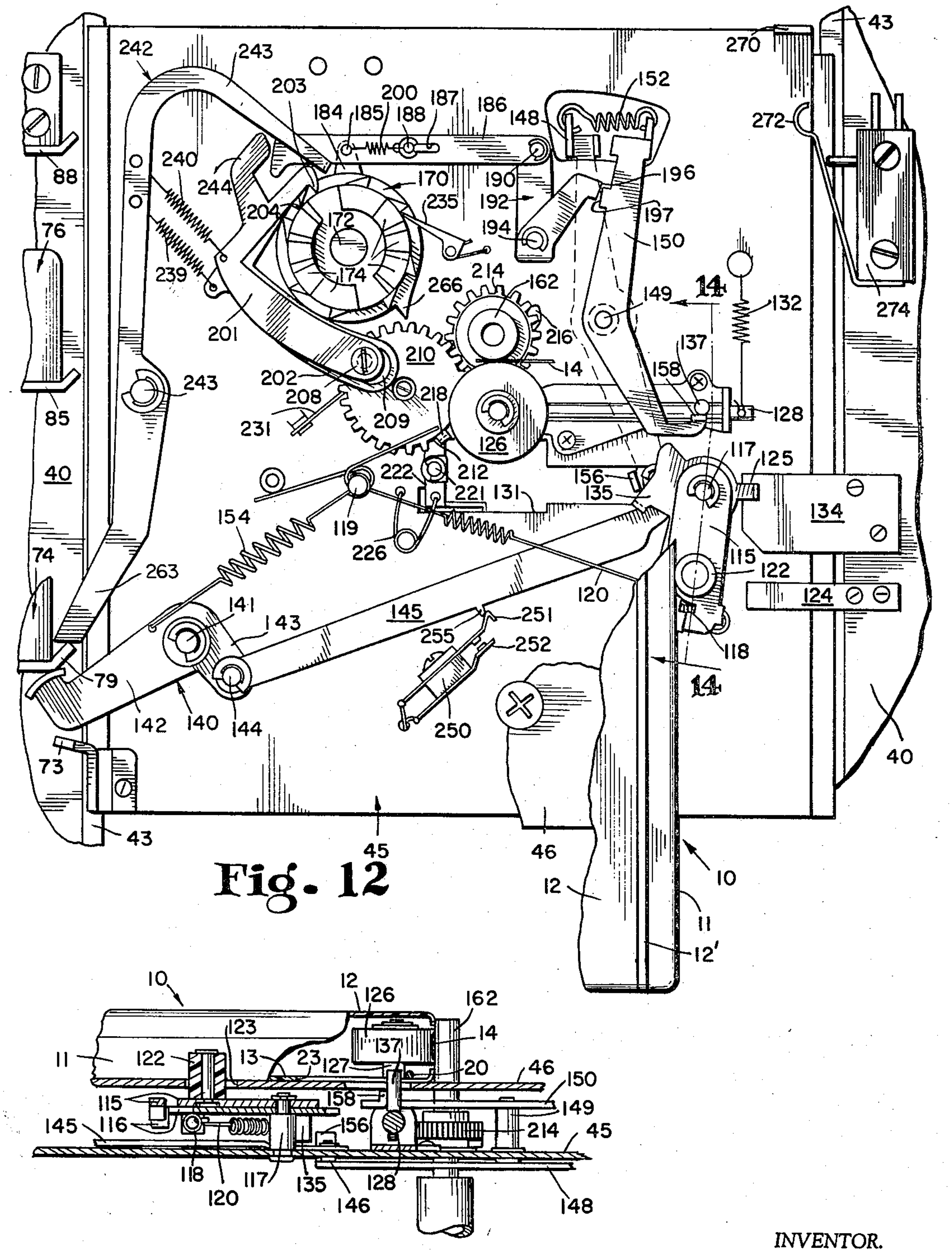
FIG. 12 is a plan view similar to FIG. 3 but showing the cartridge of FIG. 8 in operative playing position, portions of said cartridge being broken away.
FIG. 14 is a vertical section taken on line 14—14 of FIG. 12.
Figure 16:
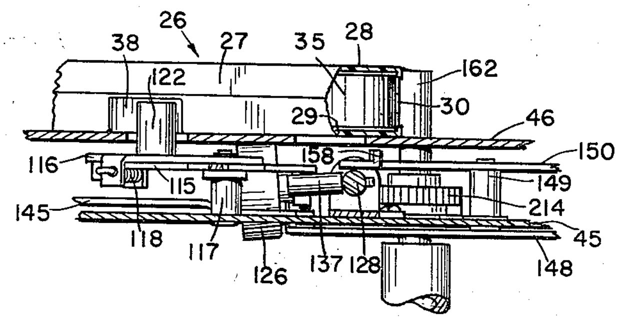
FIG. 16 is a vertical section taken on the line 16—16 of FIG. 15.

In order to drive the tape 14 in cartridge 10, I provide a pinch roller 126 rotatably mounted on a shaft 127. Said shaft projects radially from a transverse axle 128 rotatably carried in a pair of journals 129 mounted on the slide 45. An arm 130 is mounted on the axle 128 and projects radially therefrom with one of its ends connected to a spring 132 mounted on slide 45 and urging said axle 128 to rotate in a direction to swing the pinch roller 126 upwardly through openings 131 in the slide and its cover plate into an operative position parallel with said slide as shown in FIG. 14. The opposite end of arm 130 engages a stop 134 on the platform 40 projecting inwardly between the slide and its cover plate when said slide is moved into its retracted position to retract the pinch roller into a position disposed below plate 46 as shown in FIG. 16. As the slide is moved inwardly toward an operative position, lever finger 125 will move away from stop 124 and roller 122 will start to swing to the left as viewed is FIG. 3. At the same time, arm 130 will move away from stop 134 and axle 128 will start to rotate the pinch roller 126 upwardly under the action of spring 132. If cartridge 26 is inserted into the apparatus, and the pinch roller 126 is thus not needed, sensing roller 122 will swing into the cartridge recess 38 under the action of spring 120 thereby causing a projection 135 on lever 116 to swing over a radially projecting finger 137 on axle 128 and prevent upward movement of said pinch roller. With a cartridge 10 inserted in the apparatus, however, roller 122 will be retained in the position shown in FIGS. 12–14 by the adjacent planar cartridge side wall 11 so that lever projection 135 cannot move into a position overlying finger 137, and the pinch roller can move upwardly into its operative position.

As shown in FIG. 3, a bell crank 140 is swingably mounted on a post 141 on slide 45. Said crank is provided with an arm 142 projecting outwardly over platform 40 for engagement with stops 79, 85, and 88 as the slide is moved inwardly. The other crank arm 143 is swingably connected, as by pin 144, to a lever 145 having its opposite end swingably connected, as by pin 146, to a lever 148 swingably mounted on the underside of the slide by a pivot pin 149. A second lever 150 is mounted on pin 149 on the upper side of said slide, and said levers 148 and 150 are interconnected at their ends remote from lever 145 by a spring 152. A spring 154 is mounted on the slide post 119 and is connected to the crank arm 142 to bias said crank into the position shown in FIG. 3. As the slide is moved inwardly, crank arm 142 will engage one of the stops 79, 85, 88 to swing in a counter-clockwise direction thereby causing lever 145 to swing levers 148 and 150 in a counterclockwise direction. Lever 148 has an upwardly projecting finger 156 engageable with the projection 135 on lever 116 when lever 148 is swung counter-clockwise to cause lever 116 to swing in a clockwise direction.

Figure 15:
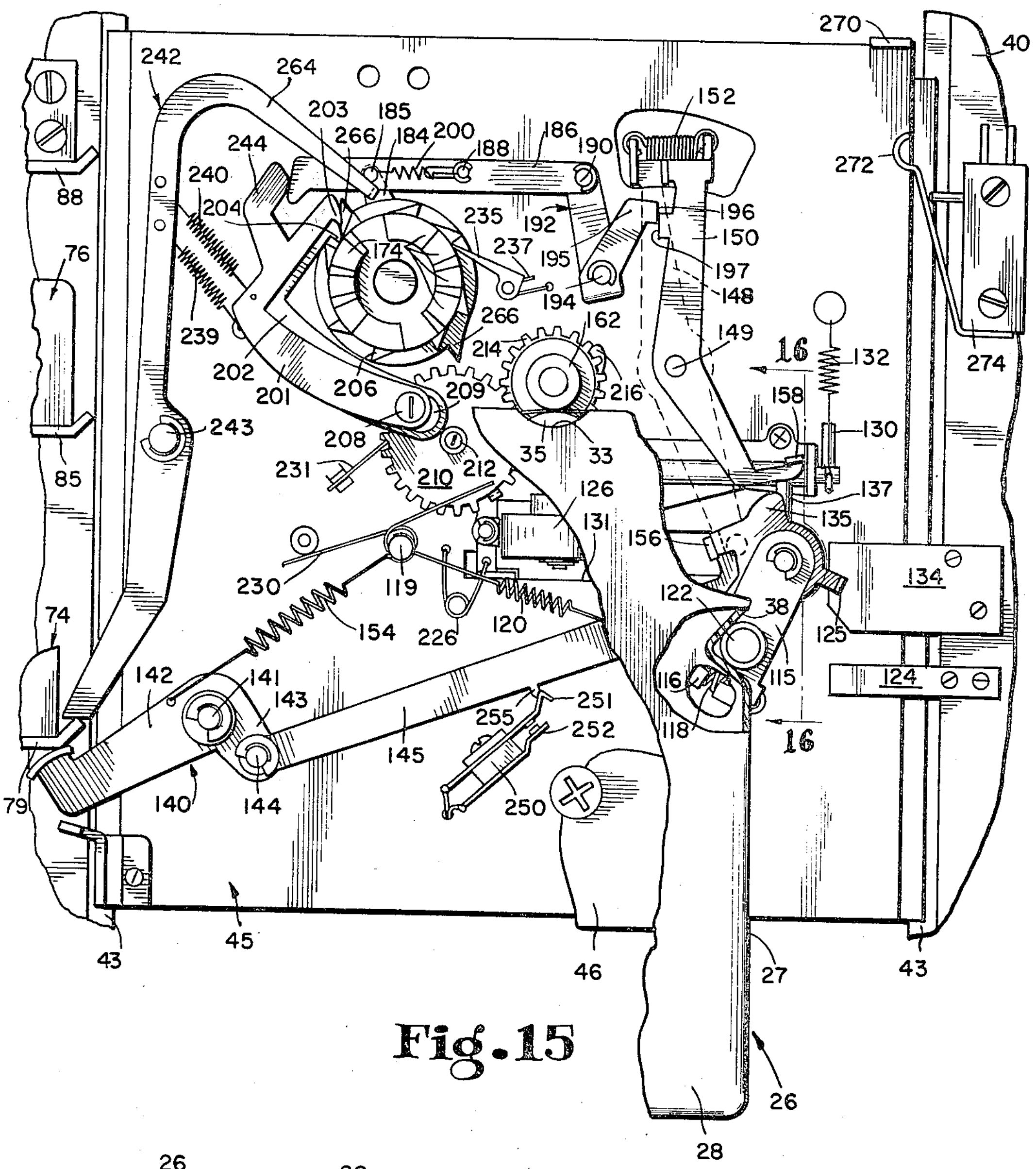
FIG. 15 is a plan view similar to FIG. 2 but showing the cartridge of FIG. 10 in operative playing position, portions of said cartridge being broken away.

Thus, as shown in FIG. 15, when a cartridge 26 is inserted into the apparatus, lever 116 will swing in a clockwise direction with its projection 135 overlying axle finger 137 for retaining pinch roller 126 retracted. Such clockwise movement of lever 116 causes spring 118 to bias lever 115 in a clockwise direction with roller 122 exerting an inward and rearward force on the cartridge recess 38. When a cartridge 10 is inserted into the apparatus, roller 122 will be held outwardly and axle 128 will rotate to move the pinch roller upwardly into the position shown in FIG. 14 in the manner previously described. The crank 142 and lever 145 will again cause levers 148 and 150 to rotate in a counter-clockwise direction, and a finger 158 on lever 150 engages the axle finger 137 to thus bias the pinch roller upwardly in its operative position under the action of spring 152 as shown in FIGS. 12 and 13. As shown in FIG. 3, a stop 160 is mounted on the platform 140 to engage crank arm 142 for guiding movement of bell crank 140 when the slide is moved to its retracted position on the platform.

The tapes 14 and 30 are driven over the head 110 by a capstan 162 connected to a rotatable drum 164 mounted on the underside of the slide. As best shown in FIG. 2, the drum 164 is connected by a drive belt 165 to a motor assembly 166 mounted under the platform 40. The capstan 162 projects upwardly from said drum through openings in the slide and its cover plate to dispose said capstan adjacent the transducer head 110 for engaging tape 14 through cartridge window 16 and tape 30 through cartridge window 33. A shown in FIG. 14, with pinch roller 126 in its operative position, the tape 14 will be interposed between said pinch roller and capstan 162 in driving engagement with said capstan. With the pinch roller in its retracted position as shown in FIG. 16, tape 30 will be interposed between the cartridge roller 35 and capstan 162 in driving engagement with said capstan.

As previously explained, tapes 14 normally employ four vertically spaced signal tracks whereas tapes 30 normally employ eight such tracks. It is therefore necessary to vertically index the head 110 with respect to the tape being played. Further, since tape 30 employs eight tracks, its uppermost track will be disposed nearer to the upper edge of the tape than will the uppermost track on tape 14. In order to orient and index the head 110 with respect to the tapes to be played and the tracks on said tapes, I provide the indexing assembly illustrated in FIGS. 3–5. As shown, said assembly comprises a stepping cam 170 rotatably and axially movable on a post 172. Two arcuate sets of cam faces 174, four in each set, are formed on the upper face of cam 170 and are engageable with a cam follower 176 mounted on the spring arm 112 supporting the head 110. Thus, as cam 170 is rotated, the follower 176 will step from one cam face 174 to another to cause the head 110 to move vertically with respect to the tape.

In order to orient the head 110 with respect to either an eight or a four track tape, cam 170 rides on an elevating cam 178 which is also rotatably carried on post 172. Cam 178 is provided with a plurality of arcuately spaced, downwardly projecting skids 180 receivable in a plurality of arcuately spaced slots 182 formed in the slide 45 and having ramps 183. As shown, an arm 184 projects radially from cam 178 and is provided with an upwardly projecting pivot pin 185. Said pin is connected to a pitman 186 having an elongated slot 187 through which an upwardly projecting pin 188 mounted on slide 45 projects. The pitman 186 is connected by a pivot pin 190 to a bell crank 182 swingable about a post 194 mounted on the slide. Crank 192 is provided with an outwardly projecting arm 195 having an up-turned end 196 engageable with a downwardly-turned tongue 197 on lever 150. Thus, upon rotation of lever 150 in a counter-clockwise direction as viewed in FIG. 3 over axle finger 137, lever tongue 197 will cause the crank 192 to move the pitman 186 to the left for rotating the cam 178 about the axis of post 172 to cause the cam skids 180 to ride upwardly on ramps 183 to rest on the upper face of the slide. As cam 178 is rotated in such direction, it will slide upwardly on post 172 to cause cam 170 to move upwardly thereby raising head 110. As shown in FIG. 3, pins 185 and 188 are interconnected by a spring 200 for moving pitman 186 to the right and rotating cam 178 in a clockwise direction as viewed in FIG. 3 to dispose the latter's skids 180 in slots 182 for thus lowering cam 170 and head 110 when lever tongue 197 is swung to the right. As will be apparent, when cartridge 26 is inserted into the apparatus, pinch roller 126 will be retained in its retracted position and lever 150 will be permitted to swing over axle finger 137 to engage crank 192 for effecting rotation of cam 178 to raise the head 110. When cartridge 10 is inserted, however, lever 150 will not engage crank 192, and spring 200 will retain cam skids 180 in slots 182 for retaining cams 178 and 170 and head 110 in their lowered positions.

Figure 7:
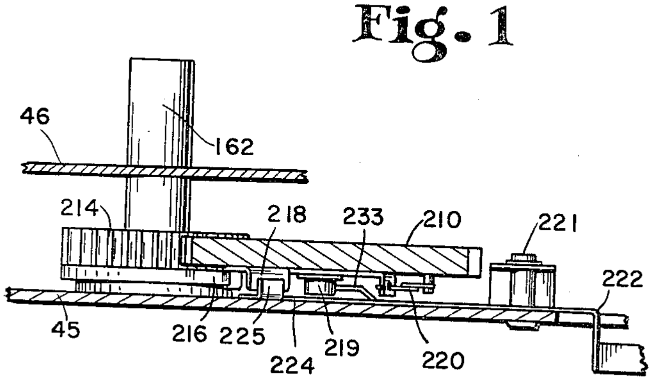
FIG. 7 is a vertical section taken on the line 7—7 of FIG. 6.
Figure 6:
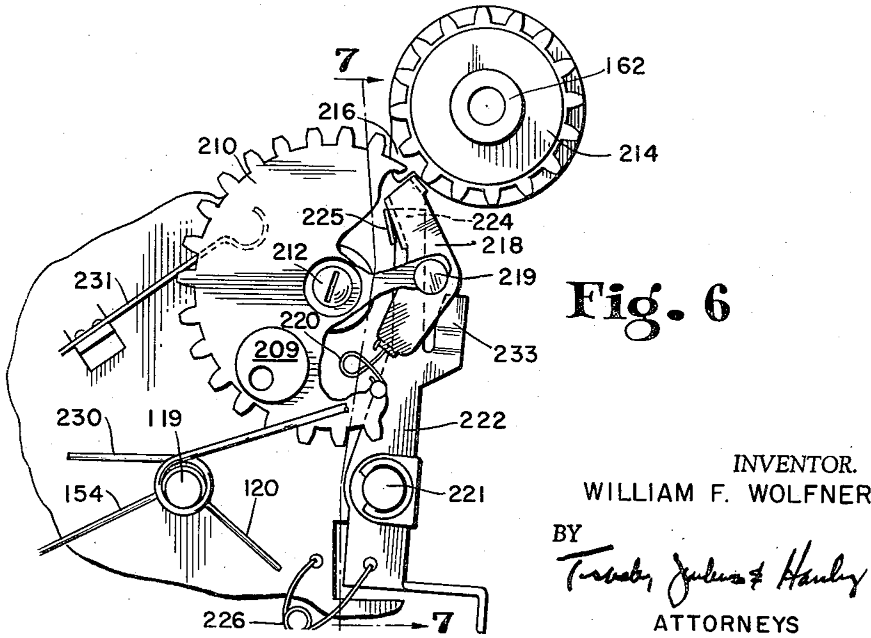
FIG. 6 is a fragmentary plan view of the head indexing assembly but with portions thereof being broken away.

Cam 170 is rotated in a stepwise sequence about post 172 by a pair of cranks 201 and 202 having hooked ends 203 and 204 engageable with circumferentially spaced teeth 206 on said cam. Cranks 201 and 202 are swingably mounted on a pin 208 and boss 209, respectively, eccentrically mounted on a gear 210 rotatable on a post 212 on the slide. As shown in FIGS. 6 and 7, said gear, which is provided with a tooth void, as at 212, is adapted to be driven by a gear 214 carried on capstan 162 below the slide plate 46. Gear 214 is provided with an outwardly projecting lug 216 below the plane of its teeth. Said lug is engageable with a crank 218 swingably mounted on pin 219 on the underside of gear 210 in the area of the tooth void 212. One end of crank 218 is connected to a spring 220 on gear 210 for releasably retaining said crank in a retracted position within the cross-sectional extent of said gear.

As shown in FIG. 6, crank 218 is swung outwardly into its operative position in the tooth void 212 against the action of spring 220 by a lever 222 swingably mounted on a post 221 on slide 45. Lever 222 has a tongue 224 provided with an upwardly projecting tab 225 engageable with crank 218 upon rotation of lever 222 to swing said crank into its operative position. Lever 222, which is normally biased inwardly by a spring 226 mounted on slide 45, is swung outwardly to swing crank 218 outwardly into its operative positive by a solenoid 228 mounted on the bottom of slide 45. When crank 218 is swung outwardly under the action of lever 222, lug 216, which rotates with capstan 162 and gear 214, engages said crank to thus rotate gear 210 through an arc sufficient to bring its teeth into mesh with the teeth on gear 214. As crank 218 rotates with gear 210, it strikes a wiper 230 mounted on the slide below said gear to swing said crank inwardly into its retracted position so that it will not reengage lug 216 until it is again moved outwardly under the action of lever 222. This causes gear 214 to rotate gear 210 through only a single revolution each time crank 218 is swung outwardly to its operative position.

As shown in FIG. 3, a spring 230 mounted on post 119 rides on gear 210 and serves as a brake against rotation of said gear. Lever 222 also has an upwardly projecting finger 233 adjacent its finger 224 which is engageable with the crank pin 219 on gear 210 when said lever is moved to its retracted position by spring 226 to thus prevent rotation of gear 210 through more than one revolution upon actuation of solenoid 228. The cam 170 is prevented from rotating in a clockwise direction as viewed in FIG. 3 by a pawl 235 swingably mounted on a post 236 on the slide and biased into engagement with the cam teeth 206 by a spring 237. Thus, actuation of solenoid 228 ensures that gear 210 will be rotated through only a single revolution and that the cam 170 will be rotated in only one direction by the cranks 201 and 202.

As shown in FIG. 3, cranks 201 and 202 are biased into engagement with the cam teeth 206 by springs 239 and 240 which are connected to a hook-shaped stop lever 242 swingably mounted on a post 243 on slide 45. Crank 201 which, because of its eccentric mounting on gear 210 and its length, is adapted to advance two teeth around the cam 170 upon rotation of gear 210 through a single revolution, while crank 202, because of its length and eccentric mounting on gear 210, is adapted to advance only one tooth around cam 170 upon rotation of said gear through a single revolution. Thus, to prevent crank 201 from being operative when cartridge 26 is inserted into the apparatus, said crank is provided with an outwardly projecting arm 244 adjacent its hook 203. As previously explained, when cartridge 26 is inserted into the apparatus, lever 150 acting through crank 192 will drive the pitman 186 to the left as viewed in FIG. 3 and into the position shown in FIG. 15. With the pitman in this position, upon rotation of gear 210, crank arm 244 will engage the adjacent end of said pitman and thus prevent the hook 203 on crank 201 from engaging the cam teeth 206. In this manner, with a cartridge 26 inserted into the apparatus, only crank 202 will be operative and thus cam 170 will be stepped one step at a time. Conversely, when a cartridge 10 is inserted into the apparatus, pitman 186 will be moved to the right as viewed in FIG. 3 into the position shown in FIG. 12. This disposes said pitman out of engagement with the arm 244 on crank 201 so that the hook 203 on said crank will engage the cam teeth 206 and thus rotate cam 170 through two steps upon one rotation of gear 210.

Figure 17:
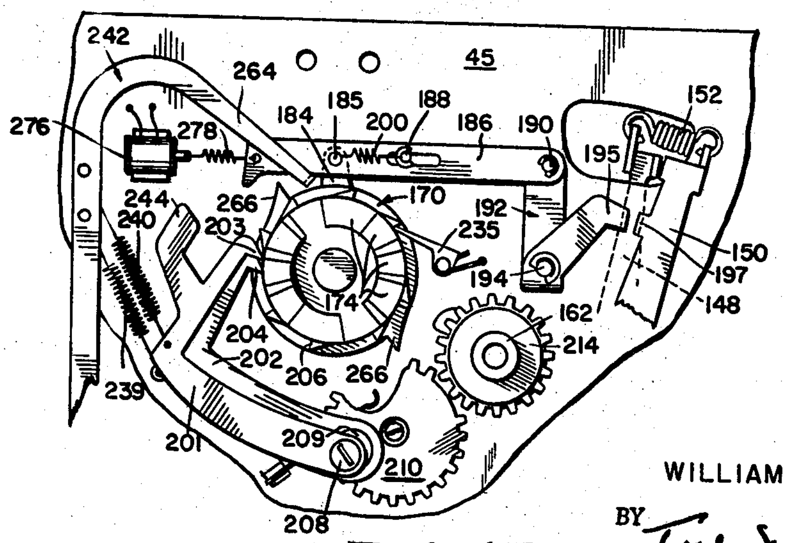
FIG. 17 is a plan view of a modified form of the actuating mechanism for the elevating cam.

A modified embodiment of the pitman-crank assembly is shown in FIG. 17. Said embodiment is adapted for use with cartridges 10 employing eight track tapes should such a tape and cartridge combination become commercially available. In such embodiment a solenoid 276 is mounted on the slide 45 and is connected by a spring 278 to the pitman 186. Thus, energization of the solenoid will pull the pitman to the left into engagement with arm 244 on crank 201 and prevent said crank from imparting a two step rotation to cam 170. Conveniently, said solenoid can be energized by any desired type of sensor mounted adjacent head 110, guide 111, or sensor 108 to contact an electrical conductive strip which the user may apply to the cartridge end wall 11 adjacent one of the windows 16–18. The spring 278 is of lesser strength than spring 200 so that the solenoid will not interfere with the normal movement of the pitman to the right in FIG. 3 under the action of spring 200 or the normal movement of the pitman to the left upon movement of crank 192 by lever 150.

The sensor 108 is electrically connected to the solenoid 228 which actuates the lever 222 for effecting rotation of cam 170. As previously explained, tapes 14 and 30 are commonly provided with electrically conductive sensing spots 24 and 36, respectively. As one of said spots passes over the sensor 108, said sensor will cause actuation of solenoid 228 to thus effect rotation of the cam 170 to step the head 110 downwardly with respect to the tape and dispose it in engagement with the next lower track on the tape. Again, the amount of downward stepping of the head will be controlled by movement of the pitman 186 in response to movement of lever 150, which in turn is dependent upon positioning of the sensing roller 122.

The head 110 can also be indexed downwardly with respect to the tape by a slight inward pressure on the cartridge carried on the slide. To this end, a momentary switch 250 having contact arms 251 and 252 is mounted on the slide 45 immediately adjacent lever 145 and is connected to the solenoid 228. An arm 255 projects outwardly from lever 145 from engagement with switch arm 241. With a cartridge disposed on the slide, inward pressure on said cartridge causes crank 142 to engage stops 79, 85, or 88 to move lever 145 to the right as viewed in FIG. 3 and arm 255 will engage contact arm 251 of switch 250 as shown in FIGS. 12 and 15. Slight additional inward movement of the slide will cause lever 145 to move further to the right as viewed in FIGS. 12 and 15 to cause arm 255 to close contact arm 251 against contact arm 252 to close switch 250 for energizing solenoid 228 to effect an indexing of head 110 in the manner previously described. When this additional inward pressure is released from the cartridge, crank 142 will be returned to the position shown in FIGS. 12 and 15 under the action of spring 154 and switch 250 will open.

As best shown in FIG. 2, a pair of swingably connected toggle links 260 and 261 are mounted on platform 40 and said slide. Said toggle links are connected at their juncture to a spring 262 mounted on the platform for thus urging the slide forwardly to its retracted position shown in FIG. 3. The slide is releasably retained in its three different operative positions against the biasing action of spring 262 by the stop lever 242. As shown in FIG. 3, the forward end 263 on said lever angles outwardly for engagement with stops 79, 85, and 88. Upon inward movement of the slide, the lever end 263 will engage said stops and be swung inwardly about the axis of post 244. After clearing said stops, said end will be swung outwardly under the action of springs 239 and 240 to engage said stops and prevent movement of the slide toward its retracted position under the action of spring 262.

The rearward end 264 of stop lever 242 is hooked forwardly and is disposed adjacent the stepping cam 170. Said cam has a pair of diametrically opposed teeth 266 circumferentially oriented between the two sets of cam faces 174. Thus, upon rotation of said cam through one-half of a revolution one of the teeth 266 engages the lever end 264 to swing lever end 263 out of engagement with stop 79, 85, or 88 so that the slide will automatically return to its retracted position under the action of spring 262.

As shown in FIG. 3, slide 45 is provided with an upwardly projecting ear 270 along its marginal edge engageable with a spring arm 272 mounted on a switch 274 on platform 40 for opening said switch when the slide is in its retracted position. The switch is connected to the power source for the deck and audio reproduction equipment connected to head 110 so that movement of the slide inwardly to one of its operative positions will close said switch for automatically supplying power to said deck and audio reproduction equipment. Conversely, movement of the slide from any one of its operative positions to its retracted position will automatically close said switch.

It may be desirable to employ the deck in a console in combination with other electrical entertainment equipment, such as disc type phonograph players. In order to automatically switch the necessary audio reproduction equipment to the deck when a cartridge is inserted into the deck, a switch 270 having a contact arm 271 interposed between a pair of contacts 272 and 274 is mounted below the platform 40 adjacent slot 61 as shown in FIG. 2. Contact arm 271 is biased toward contact 272 for opening the circuit to the deck head 110 but said arm is engaged by lug 60 on guide arm 52 which holds contact arm 271 against contact 274 when the slide is in retracted position for thus closing the circuit to any such other entertainment equipment. However, movement of the guide arm 52 upon insertion of a cartridge into the deck will permit contact arm 271 to close against contact 272 to close the circuit to head 110.

Operation of the deck with a small size cartridge 10 as shown in FIG. 12 may be described as follows. The cartridge is inserted over the cover plate 46 and under the bracket flange 50, said cartridge being guided by its rib 12′ being received in one of the grooves 50′ and by roller 52 and bracket web 49 engaging the right side wall and arm roller 56 engaging its left side wall. As the cartridge is inserted, guide arm 52 will swing rearwardly against its spring 62, and its pin 64 will swing the lever 68 out of locking engagement with slide stop 73, said guide arm being locked in its rearward position by lever pin 98 engaging in notch 96 of link 94. As the cartridge is pushed inwardly, the tape 14 will come into engagement with head 110, guide 111, and sensor 108. The inward movement of the cartridge moves the slide 45 inwardly with respect to the platform 40 with switch 270 closing the circuit to the head and switch 274 closing to connect the head 110, capstan motor 166, and solenoid 228 to the power supply. During such inward movement, stop lever 242 will pivot around stop 79 and engage the rearward face of said stop under the action of springs 239 and 240 for holding the slide in its inward operative position.

As shown in FIG. 12, as the cartridge is inserted under the bracket flange 50, guide roller 122 is urged outwardly by the planar cartridge side wall 11 to prevent projection 135 on lever 116 from moving over axle finger 137. Thus, axle 128 is rotated by action of spring 132 to move the pinch roller 126 upwardly through the opening 23 in the cartridge floor to cause said pinch roller to hold the tape 14 in driving engagement with the rotating capstan 162. As the pinch roller moves upwardly to its operative position, its shaft 127 bears against cartridge spring 20 to release the locking finger 21 to permit the cartridge reel 15 to rotate. During the inward movement of slide 45 to bring stop lever 242 into locking engagement with stop 79, bell crank 140 rotates to move lever 145 to the right as viewed in FIG. 12 causing lever 148 to move in a counter-clockwise direction. This causes spring 152 to move lever 150 in a counter-clockwise direction with its finger 158 engaging axle finger 137 to thus bias the pinch roller into its operative engagement with the tape 14.

When tape 14 has been driven sufficiently to cause its sensing spot 24 to move over sensor 108, said sensor energizes solenoid 228 to cause arm 222 to swing crank 218 on gear 210 outwardly into the tooth void 212. The lug 217 rotating with the capstan 162 will then engage crank 218 to rotate gear 210 through an arc sufficient to bring its teeth into driving engagement with the teeth on gear 214 for thus rotating gear 210 to move crank 201 around the teeth 206 for advancing cam 170 through two steps. Gear 210 is prevented from moving through more than a single revolution by wiper 230 moving crank 218 to its retracted position and by the tongue 233 of lever 222 engaging crank pin 219. With cam follower 176 engaging the cam faces 174 on cam 170, the head 110 is stepped downwardly with respect to tape 14 by the spring action of arm 112 for thus stepping the head downwardly to the next track on said tape. If it is desired to step the head downwardly from one track to another without waiting until the sensing spot 24 has moved over sensor 108, it is merely necessary to exert a slight inward push on the cartridge, whereupon crank 140 engages stop 79 to move lever 145 sufficiently to cause its arm 255 to close switch 250 for energizing solenoid 228 to thus effect rotation of gear 210 so that cam 170 will rotate to step head 110 downwardly.

The downward stepping of head 110 is continued until all of the tracks on the tape have been played whereupon cam 170 will have been rotated 180° to bring one of its teeth 266 into engagement with stop lever 242. When one of the teeth 266 engages said stop lever, the lever will be swung in a clockwise direction to clear stop 79, and the slide 45 will automatically be returned to its retracted position under the action of spring 262 and toggle links 260 and 261. Return of the slide to its retracted position causes stop 134 on the platform to engage axle arm 130 to rotate the axle in a direction to move the pinch roller 126 downwardly out of the cartridge and into its retracted position shown in FIG. 16. Return of the slide to its retracted position also opens switch 274 to remove the power from the capstan motor 166 and head 110. When the cartridge is removed from the deck, guide arm 52 will swing into its retracted position shown in FIG. 1 under the action of spring 62 to cause lever 68 to lock around slide stop 73 and cause arm lug 60 to open switch contacts 271 and 272. And return of the slide to its retracted position also causes stop 124 to engage lever finger 125 to swing sensing roller 122 against the action of spring 120.

Operation of the deck with a large size cartridge 10 is the same as with operation of the deck with a small size cartridge with the exception of the movement of the link assembly. As shown in FIG. 13, such a large size cartridge is supported on the slide cover 46 and guide arm 52 with its rib 12′ received in one of the bracket grooves 50′. The right cartridge side wall is disposed against the bracket web 49 and guide roller 51, and the left cartridge side wall is disposed against the guide roller 57 on arm 52 and the guide roller 93 mounted on the platform.

Such cartridge is inserted into the deck in the same manner as a small cartridge. However, upon such insertion, the front side wall of the cartridge will first engage the guide arm flange 58 to swing the guide arm rearwardly and outwardly until its roller 57 engages the left side wall of the cartridge. As the arm 52 is swung outwardly, its pin 64 causes lever 68 to swing outwardly releasing said lever from the guide stop 73. The outward swinging movement of lever 68 causes its pin 90 to first engage link hook 78 for swinging link 74 outwardly and then to engage link hook 84 for swinging link 76 outwardly. As shown in FIG. 13, this causes the link stops 79 and 85 to be swung outwardly so that the slide stop lever 242 is free to engage the rearwardmost stop 88 for locking the slide in its most rearward operative position. The other operations of the deck for driving and playing the tape are the same as those previously described in connection with the smaller size cartridge 10.

If an intermediate size cartridge 10 is employed, guide arm 52 will swing lever 68 outwardly by an amount only sufficient to cause lever pin 90 to swing link 74 outwardly so that its stop 79 is disposed out of alignment with stops 85 and 88. With stop 79 moved outwardly, the slide stop lever 242 is free to engage stop 85 on link 76 for releasably retaining the slide in its intermediate operative position.

When a cartridge 26 is inserted into the deck, it will be interposed between the slide bracket web 49 and guide roller 56. Its engagement with roller 56 will cause guide arm 52 to move lever 68 out of engagement with slide stop 73 to permit the slide to be moved inwardly into its operative position with stop lever 242 engaging stop 79 on link 74 for thus releasably locking the slide in its operative position.

As shown in FIG. 15, with cartridge 26 in operative position, the sensing roller 122 swings inwardly under the action of spring 120 through the opening 121 in the bracket web 49 for reception into the cartridge notch 38. The inward swinging movement of sensing roller 122 causes projection 135 on link 116 to swing inwardly over the axle finger 137 so that axle 128 is prevented from rotating the pinch roller 126 upwardly into an operative position even though axle arm 130 is disposed out of engagement with the platform stop 134.

Movement of the slide to its operative position causes crank 140 to move lever 145 to the right as shown in FIG. 3 to swing lever 148 in a counterclockwise direction with its finger 156 engaging lever projection 135 tending to rotate lever 115 in a clockwise direction. This increases the tension on spring 118 to cause roller 122 seated in cartridge notch 38 to urge said cartridge rearwardly with its tape in driving engagement with the capstan. The counterclockwise movement of lever 148 also causes spring 152 to move lever 150 in a like direction to bear against crank 192 for moving pitman 186 to the left as viewed in FIG. 3, thereby rotating elevating cam 178 and causing cam 170 to rise for disposing head 110 in engagement with the uppermost track on tape 30. Such leftward movement of pitman 186 also causes said pitman to engage the arm 244 on crank 201 to move said crank out of position to engage teeth 206 of cam 170. Thus, rotation of gear 210 in the manner previously described will permit only the single step crank 202 to engage cam teeth 206 for rotating said cam one step at a time for advancing it from one track to another over tape 30. Again, as with the cartridge 10, head 110 is advanced from one track to another upon energization of solenoid 228 in response to sensor 108 engaging sensing spot 36 or lever arm 255 closing switch 250.

When all of the tracks on the tape have been played, one of the cam teeth 266 will engage stop lever 242 to swing it out of engagement with stop 79 whereupon the slide 45 will be moved to its retracted position under the action of spring 262 and toggle links 260 and 261. When the slide is moved to its retracted position, crank 140 will be disposed out of engagement with stop 79 to rotate lever 150 out of engagement with crank 192 whereupon pitman 186 will be moved to the right as viewed in FIG. 15 out of engagement with arm 244 on crank 201. Such movement of the pitman also rotates elevating cam 178 to cause its skids 180 to move into the slide holes 182 for lowering cam 170 and head 110.

With the slide in its retracted position switches 274 and 271 will open in the manner previously described in connection with cartridge 10. Further, with the slide retracted, stop 124 will engage lever finger 125 to rotate the sensing roller 122 to the retracted position shown in FIG. 1 and dispose lever projection 135 out of its position overlying axle finger 135 so that the pinch roller can be moved into its operative position should a cartridge 10 be inserted into the deck.

It is to be understood, of course, that various changes in the details, which have been herein described and illustrated in order to explain the nature of the invention, may be made by those skilled in the art within the principle and scope of the invention, and I desire to be limited only by the scope of the claims appended hereto.

I claim:

1. In a deck for magnetic tapes having a plurality of tracks thereon and carried in endless coils in cartridges having different tape driving requirements and different sizes, a transducer head, a capstan for driving said tape over said head, a cartridge-carrying slide mounted on a platform and movable to position said tape against said head and capstan, means for holding different size cartridges on said slide including a bracket mounted on the slide engageable with a side wall in said cartridges and roller means swingably supported from said platform and biased into engagement with the opposed side wall on said cartridges, locking means releasably locking said slide in position to dispose said tape against said head and capstan, a pinch roller movable between retracted and operative positions, and sensing means for determining the driving requirements of a cartridge, said sensing means being actuable for selectively urging one type of cartridge into a position to dispose its tape in driving engagement with said capstan or effecting movement of said pinch roller into its operative position to interpose the tape in another type of cartridge between said pinch roller and capstan in driving engagement with said capstan.

2. In a deck for magnetic tape disposed in an endless coil in a cartridge and having a plurality of tracks thereon, a transducer head, a capstan for driving said tape over said head, a cartridge-carrying slide movable to position said tape against said head and capstan, means for holding said tape in driving engagement with said capstan, a rotatable cam means having a plurality of cam faces and a plurality of projections around its periphery, a cam follower engageable with said cam faces and associated with said head to move said head relative to the tape upon rotation of said cam to cause said head to engage different tracks on said tape, a driver gear, a driven gear, crank means engageable with said projections and swingably mounted in eccentric positions on said driven gear, and means for disposing said driven gear into operative engagement with said driver gear for rotating said driven gear to cause said cranks to engage said projections for rotating said cam.

3. In a deck for magnetic tape disposed in an endless coil in a cartridge and having a plurality of tracks thereon, a transducer head, a capstan for driving said tape over said head, a cartridge-carrying slide movable to position said tape against said head and capstan, means for holding said tape in driving engagement with said capstan, a first cam rotatably and axially movable on a post and having a plurality of cam faces, a second cam rotatably and axially movable on said post below said first cam, said second cam being movable with respect to first cam for adjusting the relative position of said first cam and head with respect to said tape, a cam follower engageable with said cam faces and associated with said head to move said head relative to the tape upon rotation of said cams, and means for rotating said cams independently of each other to cause said head to engage different tracks on said tape.

4. In a deck for magnetic tapes having a plurality of tracks thereon and carried in endless coils in cartridges having different tape driving requirements and different sizes, a transducer head, a capstan for driving said tape over said head, a cartridge-carrying slide movable to position said tape against said head and capstan, means for holding different size cartridges on said slide, locking means releasably locking said slide in position to dispose said tape against said head and capstan, a pinch roller carried on an axle having a finger thereon and biased toward an upward operative position, a first and second interconnected links swingably mounted on said slide, a roller mounted on said first link, spring means urging said links inwardly to dispose said roller in engagement with the side walls of the cartridges, said roller being engageable with a notch in the side wall of one type of cartridge for urging said cartridge into position to dispose its tape against said capstan and swinging said second link over said axle finger to prevent movement of said pinch roller into its operative position and being engageable with the side wall of another type of cartridge to swing said second link out of alignment with said axle finger to permit said pinch roller to move into its operative position to interpose the tape in said another type of cartridge between said pinch roller and capstan, third and fourth interconnected links swingably mounted on said slide, said third link being connected to lever means movable upon movement of said slide to position the tape against said head and capstan to swing said third and fourth links with respect to said axle, said fourth link having a finger engageable with said axle finger upon movement of said pinch roller into its operative position to urge said pinch roller against the tape in said another type of cartridge, and indexing means for indexing said head into engagement with the desired tracks on said tape.

5. In a deck for magnetic tapes having a plurality of tracks thereon and carried in endless coils in cartridges having different tape driving requirements and different sizes, a transducer head, a capstan for driving said tape over said head, a cartridge-carrying slide movable to dispose said tape against said head and capstan, means for holding different size cartridges on said slide, locking means releasably locking said slide in position to dispose said tape against said head and capstan, a pinch roller movable between retracted and operative positions, sensing means for determining the driving requirements of a cartridge, said sensing means being actuatable for holding said pinch roller in retracted position and selectively urging one type of cartridge into position to dispose its tape in driving engagement with said capstan or effecting movement of the pinch roller into its operative position to interpose the tape in another type of cartridge between said pinch roller and capstan in driving engagement with said capstan, a first rotatable cam having a plurality of cam faces and circumferentially spaced teeth, said head being supported on an arm having a cam follower biased into engagement with said cam faces, a second cam supporting said first cam and rotatable to vertically move said first cam and head with respect to said tape, first and second cranks movable into engagement with said first cam teeth for rotating said first cam through different arcs of rotation for disposing different ones of said cam faces in engagement with said cam follower to move said head with respect to the tracks on said tape, and a pitman biased into a first position in which it is out of engagement with one of said cranks and said second cam is in a lowered position and movable into a second position in which it engages said one of said cranks and rotates said second cam to a raised position by means operative upon actuation of said sensing means to dispose the tape in said one type of cartridge in driving engagement with said head and capstan.

6. In a deck for magnetic tapes having a plurality of tracks thereon and carried in endless coils in cartridges having different sizes, a platform, a transducer head, a capstan for driving said tape over said head, a slide movably supported on said platform for movement between a retracted position in which the tape is spaced from said head and capstan and an operative position in which said tape is disposed against said head and capstan, a plurality of stops on said platform, locking means on said slide movable into selective engagement with said stops for releasably locking said slide in its operative position, a pinch roller movable between a retracted position below said cartridge and an operative position within said cartridge to interpose said tape between said pinch roller and capstan in driving engagement with said capstan, a first link swingably mounted on said platform and having one of said stops thereon, a second link swingably mounted on said platform and having a second one of said stops thereon, said first and second links being biased into operative positions in engagement with a third stop mounted on said platform for selective engagement with said locking means on the slide and for holding different size cartridges on said slide, an arm swingably mounted on said platform, said arm being engageable with said cartridge and operatively connected to said first and second links for selectively swinging said links out of their operative positions, and indexing means for indexing said head into engagement with the desired track on said tape.

7. In a deck for magnetic tapes having a plurality of tracks thereon and carried in endless coils in cartridges having different tape driving requirements and different sizes, a transducer head, a capstan for driving said tape over said head, a cartridge-carrying slide movable to position said tape against said head and capstan, means for holding different size cartridges on said slide, locking means releasably locking said slide in position to dispose said tape against said head and capstan, a pinch roller movable between retracted and operative positions, and sensing means for determining the driving requirements of a cartridge, said sensing means being actuatable for selectively urging one type of cartridge into a position to dispose its tape in driving engagement with said capstan or effecting movement of said pinch roller into its operative position to interpose the tape in another type of cartridge between said pinch roller and capstan in driving engagement with said capstan, said pinch roller being biased toward its operative position and said sensing means retaining said roller in its retracted position when said one type of cartridge is carried on the slide and releasing said roller for movement into operative position when said another type of cartridge is carried on the slide.

8. In a deck for magnetic tapes having a plurality of tracks thereon and carried in endless coils in cartridges having different tape driving requirements and different sizes, a tranducer head, a capstan for driving said tape over said head, a cartridge-carrying slide movable to position said tape against said head and capstan, means for holding different size cartridges on said slide, locking means releasably locking said slide in position to dispose said tape against said head and capstan, a pinch roller movable between retracted and operative positions, sensing means for determining the driving requirements of a cartridge, said sensing means being actuatable for selectively urging one type of cartridge into a position to dispose its tape in driving engagement with said capstan or effecting movement of said pinch roller into its operative position to interpose the tape in another type of cartridge between said pinch roller and capstan in driving engagement with said capstan, and means for indexing said head into engagement with the desired tracks on said tape.

9. The invention as set forth in claim 8 in which said indexing means is operative in response to actuation of said sensing means and/or movement of said slide with respect to said head and capstan for indexing said head against the desired tracks on said tape.

10. The invention as set forth in claim 1 in which said bracket has a web engageable with said side wall of the cartridge and a flange engageable with the top wall of said cartridge.

11. In a deck for magnetic tapes having a plurality of tracks thereon and carried in endless coils in cartridges having different tape driving requirements and different sizes, a platform, a transducer head carried on a movable arm, a cam follower on said arm, a capstan for driving said tape over said head, a cartridge-carrying slide movable on said platform to position said tape against said head and capstan, means for holding different size cartridges on said slide, a pinch roller carried on axle means for movement between retracted and operative positions, sensing means for determining the driving requirements of said cartridge, said sensing means being actuatable for selectively urging one type of cartridge into position to dispose its tape in driving engagement with said capstan or effecting movement of said pinch roller into its operative position to interpose the tape in another type of cartridge between said pinch roller and capstan in driving engagement with said capstan, a first cam having a plurality of cam faces engageable with said cam follower and movable for moving said head relative to the tape, a second cam supporting said first cam and movable with respect to said first cam for moving said first cam and head relative to the tape, means for moving said first cam in response to movement of said slide with respect to the platform, a pitman connected to said second cam, lever means engageable with said pitman and operatively interconnected to said sensing means for moving said pitman and second cam in one direction upon actuation of said sensing means to urge said one type of cartridge into driving engagement with said capstan, and biasing means connected to said pitman and second cam for urging said pitman and second cam to move in an opposite direction upon actuation of said sensing means to effect movement of said pinch roller into its operative position with said another type of cartridge.

12. The invention as set forth in claim 11 with the addition that a solenoid is operatively connected to said pitman for moving said pitman in said one direction upon actuation of said solenoid, and a sensor connected to said solenoid and engageable with means on a cartridge for actuating said solenoid.

13. The invention as set forth in claim 2 in which said driven gear has a tooth void over an arcuate segment of its circumference, and said means for disposing said driven and driver gears, in operative engagement comprises a crank swingably mounted on said driven gear within the extent of said arcuate segment, means for moving said crank to and from an operative position projecting outwardly from said driven gear, anrd a lug on said driven gear engageable with said crank when it is in its operative position for rotating said driven gear to bring the teeth on said driven and driver gears into engagement for rotating said driven gear through one revolution.

14. The invention as set forth in claim 13 with the addition that means are provided for releasably restraining said driven gear from rotating.

15. The invention as set forth in claim 2 in which said driven gear has a tooth void over an arcuate segment of its circumference, and said means for disposing said driven and driver gears in operative engagement comprises a crank swingably mounted on said driven gear within the extent of said arcuate segment, a lever movable upon actuation of a solenoid for swinging said crank into an operative position projecting outwardly from said driven gear, a wiper for moving said crank into a retracted position disposed inwardly of the periphery of said driven gear, and a lug on said driven gear engageable with said crank when it is in its operative position for rotating said driven gear to bring the teeth on said driven and driver gears into engagement for rotating said driven gear through one revolution.

16. The invention as set forth in claim 15 with the addition that signal sensing means are provided for sensing signal spots on said tape, and said solenoid is actuated by said signal sensing means.

17. The invention as set forth in claim 15 in which lever means are mounted on the slide for actuating said solenoid upon movement of said slide with respect to said head and capstan.

18. In a deck for magnetic tape having a plurality of tracks thereon and carried in a cartridge, a platform, a transducer head carried on a movable arm, a capstan for driving said tape over said head, a cartridge-carrying slide movable on said platform between a retracted position and an operative position in which said tape is disposed against said head and capstan, cam means operatively connected to said head and movable for moving said head relative to said tape, locking means mounted on said slide and engageable with means on said platform for releasably locking said slide in its operative position, said locking means being engageable with said cam upon a predetermined movement of said cam means to move said locking means out of engagement with said means on the platform to permit movement of said slide to its retracted position, said capstan being driven by a motor controlled by switch means mounted on said platform, and means mounted on said slide engageable with said switch means for closing said switch means to energize said motor upon movement of said slide to its operative position and opening said switch means to deenergize said motor upon movement of said slide to its retracted position.

19. In a deck for magnetic tapes having a plurality of tracks thereon and carried in endless coils in cartridges having different sizes, a platform, a transducer head, a capstan for driving said tape over said head, a cartridge-carrying slide movable on said platform between a retracted position in which the tape in said cartridge is spaced from said head and capstan and an operative position in which said tape is disposed against said head and capstan, link means on said platform biased toward said slide for holding different size cartridges on said slide, locking means on said slide and platform releasably locking said slide in its operative position, a pinch roller movable between a retracted position below said cartridge and an operative position within said cartridge to interpose said tape between said pinch roller and capstan in driving engagement with said capstan, means for moving said pinch roller into operative and retracted positions upon movement of said slide to its operative and retracted positions, respectively, and indexing means for indexing said head into engagement with the desired track on said tape.

20. The invention as set forth in claim 6 with the addition that said slide has a bracket mounted thereon adapted to engage one side of said cartridge, a plurality of rollers are mounted on said arm adapted to engage an opposite side of said cartridge, and biasing means are connected to said arm for urging at least one of said rollers into bearing engagement with said opposite side of said cartridge.

21. The invention as set forth in claim 20 with the addition that said cartridges have ribs along their top walls and said bracket has a web engageable with said one side of said cartridge and flange overlying the cartridge top wall, said flange being grooved for the reception of the ribs on said top wall.

22. In a deck for magnetic tapes having a plurality of tracks thereon and carried in endless coils in cartridges having different sizes, a platform, a transducer head, a capstan for driving said tape over said head, a side movably supported on said platform for movement between a retracted position in which said tape is spaced from the head and capstan and an operative position in which said tape is disposed against said head and capstan, a pinch roller mounted on an axle on said slide, a spring biased arm connected to said axle urging said pinch roller toward an operative position within said cartridge to force said tape into driving engagement with said capstan, a stop on said platform engageable with said arm for rotating said axle to move the pinch roller into a retracted position upon movement of said slide to its retracted position, a finger mounted on said axle, lever means swingably mounted on said slide, said lever means being engageable with said stop upon movement of said slide to its operative position to swing said lever means into engagement with said finger for increasing the force of said pinch roller against said tape, and indexing means for indexing said head into engagement with the desired track on said tape.

23. In a deck for magnetic tapes having a plurality of tracks thereon and carried in endless coils in cartridges having different tape driving requirements, a transducer head, a capstan for driving the tape over said head, a cartridge-carrying slide movable to position said tape against said head and capstan, locking means releasably locking said slide in position to dispose said tape against said head and capastan, a pinch roller movable between retracted and operative positions, sensing means for determining the driving requirements of a cartridge, said sensing means being actuatable for selectively urging one type of cartridge into a position to dispose its tape in driving engagement with said capstan or effecting movement of said pinch roller into its operative position to interpose the tape in another type of cartridge between said pinch roller and capstan in driving engagement with said capstan, and indexing means for indexing said head with respect to said tape to dispose said head in operative engagement with the desired tracks on said tape.

24. The invention as set forth in claim 23 in which said indexing means is operatively connected to said sensing means and a sensor, said sensor sensing the end of a track on said tape for actuating said indexing means to move said head with respect to the tape, and said sensing means controlling said indexing means to control the relative movement between said head and tape.

References Cited

UNITED STATES PATENTS

| | | | |
|---|---|---|---|
| 2,468,198 | 4/1949 | Heller | 179—100.2 |
| 2,864,611 | 12/1958 | Gray | 271—2.18 |
| 2,933,319 | 4/1960 | Proctor | 274—11 |
| 2,944,825 | 7/1960 | MacSinger | 274—4 |
| 2,951,914 | 9/1960 | Du Bois | 179—100.2 |
| 3,027,112 | 3/1962 | Flan | 242—55.13 |
| 3,096,920 | 7/1963 | Schober | 226—181 |
| 3,113,708 | 12/1963 | Moulic | 226—181 |
| 3,126,162 | 3/1964 | MacKenzie | 242—55.19 |
| 3,267,591 | 8/1966 | Locke et al. | 35—35 |
| 3,319,858 | 5/1967 | Schober et al. | 226—90 |

BERNARD KONICK, Primary Examiner

JEROME P. MULLINS, Assistant Examiner

U.S. Cl. X.R.

179—100.2